United States Patent
Champoux et al.

(12) 
(10) Patent No.: US 8,763,382 B2
(45) Date of Patent: Jul. 1, 2014

(54) TURBO SCREEN

(75) Inventors: Sylvain Champoux, Laval (CA); Alfin Leo, Laval (CA); Ilko Paunov, Laval (CA)

(73) Assignee: Parker Hannifin Canada, Ontario (CA)

( * ) Notice: Subject to any disclaimer, the term of this patent is extended or adjusted under 35 U.S.C. 154(b) by 137 days.

(21) Appl. No.: 13/274,060

(22) Filed: Oct. 14, 2011

(65) Prior Publication Data

US 2012/0090300 A1 Apr. 19, 2012

Related U.S. Application Data

(60) Provisional application No. 61/362,940, filed on Oct. 14, 2010.

(51) Int. Cl.
*F01N 3/02* (2006.01)
(52) U.S. Cl.
USPC .............. 60/311; 60/323; 60/324; 55/445; 55/525
(58) Field of Classification Search
None
See application file for complete search history.

(56) References Cited

U.S. PATENT DOCUMENTS

| | | | | |
|---|---|---|---|---|
| 3,286,459 A | * | 11/1966 | Ephraim, Jr. | 60/614 |
| 3,352,104 A | * | 11/1967 | Duerr | 60/614 |
| 3,735,587 A | * | 5/1973 | Addie et al. | 60/624 |
| 4,077,739 A | * | 3/1978 | Heilenbach | 415/121.2 |
| 4,821,520 A | * | 4/1989 | Rumfield | 60/614 |
| 7,174,709 B1 | * | 2/2007 | Trager | 60/311 |
| D621,852 S | * | 8/2010 | Zunik | D15/5 |
| 2008/0041045 A1 | * | 2/2008 | Zhan | 60/301 |
| 2009/0266064 A1 | * | 10/2009 | Zheng et al. | 60/317 |

OTHER PUBLICATIONS

Farr Railroad Products Specifications—Exhaust Turbo Screen and Trap—For EMD GP 40, SD 40, & SD 45 Turbocharged Locomotives. © Copyright 1978 Farr Company, Los Angeles, CA.

* cited by examiner

*Primary Examiner* — Jesse Bogue
(74) *Attorney, Agent, or Firm* — Patterson & Sheridan, LLP

(57) ABSTRACT

The present invention generally relates to methods and apparatus for use in exhaust manifold assemblies of large diesel engines, such as ships, locomotives and the like. In one aspect, a screen for use in an exhaust manifold assembly is provided. The screen includes a plate formed in a concave shape. The plate has a plurality of apertures and a plurality of radially oriented closed slots formed therein. The screen further includes a band on an outer perimeter of the plate. In another aspect, a reducer assembly for use in an exhaust manifold assembly is provided. In yet a further aspect, a method of using a screen in an exhaust manifold assembly is provided.

17 Claims, 5 Drawing Sheets

TURBO SCREEN

CROSS-REFERENCE TO RELATED APPLICATION

This application claims benefit of U.S. Provisional Patent Application Ser. No. 61/392,940 filed Oct. 14, 2010, which is incorporated by reference in its entirety.

BACKGROUND OF THE INVENTION

1. Field of the Invention

Embodiments of the invention generally relate to methods and apparatus for use in exhaust manifold assemblies of large diesel engines, such as engines for ships, locomotives and the like. More particularly, the invention relates to a screen for protecting a turbocharger of a diesel locomotive.

2. Description of the Related Art

Turbo screens are utilized in the exhaust manifolds of diesel locomotives to prevent failed engine parts or other debris from entering and damaging the turbo charger. Typically, turbo screens are subject to temperature cycling during operation due to the temperature changes of exhaust gas flowing through the turbo screen at different engine settings during use. Exhaust gases of a locomotive engine can quickly go from relatively low temperatures at idle setting to higher temperatures at higher notch settings. However, such a temperature change is not instantly homogeneous in the system, with the center of the turbo screen reaching the higher temperatures more quickly than the outer radial section which remains at lower temperatures. Conventional turbo screens are fabricated from a perforated, thick steel flat plate in order to have sufficient impact resistance. Due to the temperature cycling, the apertures perforating the steel flat plate are typically arranged in a radial flowered pattern, such that the center region has a low, open area as compared to the radial area. The radial flowered pattern is used because the pattern has demonstrated a resistance to cracking during the life of the turbo screen, which other patterns are prone to failure. However, the radial flowered pattern also contributes to high pressure drop which adversely affects engine performance of the diesel locomotive. Moreover, the thick material needed to obtain the impact resistance makes the steel flat plate turbo screen expensive. Therefore, there is a need for an improved turbo screen.

SUMMARY OF THE INVENTION

The present invention generally relates to methods and apparatus for use in exhaust manifolds of large diesel engines, such as engines for ships, locomotives and the like. In one aspect, a screen for use in an exhaust manifold assembly is provided. The screen includes a plate formed in a concave shape. The plate has a plurality of apertures and a plurality of radially oriented closed slots formed therein, wherein the slots separate the apertures into predefined sections, and wherein a radially outward end of each of the slots is spaced from a perimeter of the plate.

In another aspect, the screen further includes a band on an outer perimeter of the plate, wherein the band allows the plate to be formed into the concave shape while maintaining a circular profile which facilitates attachment to a reducer in the exhaust manifold.

In another aspect, a reducer assembly for use in an exhaust manifold assembly is provided. The reducer assembly includes a reducer having an inlet and an outlet. The assembly further includes a screen attached to the inlet of the reducer. The screen includes a concave plate having a plurality of apertures and a plurality of radially oriented closed slots formed therein.

In yet a further aspect, a method of using a screen in an exhaust manifold is provided. The method includes the step of directing diesel exhaust through the screen attached to a reducer of an exhaust manifold. The screen has a concave plate with a plurality of apertures and a plurality of radially oriented closed slots formed therein. The method further includes the step of driving a turbo charger with the screened exhaust.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
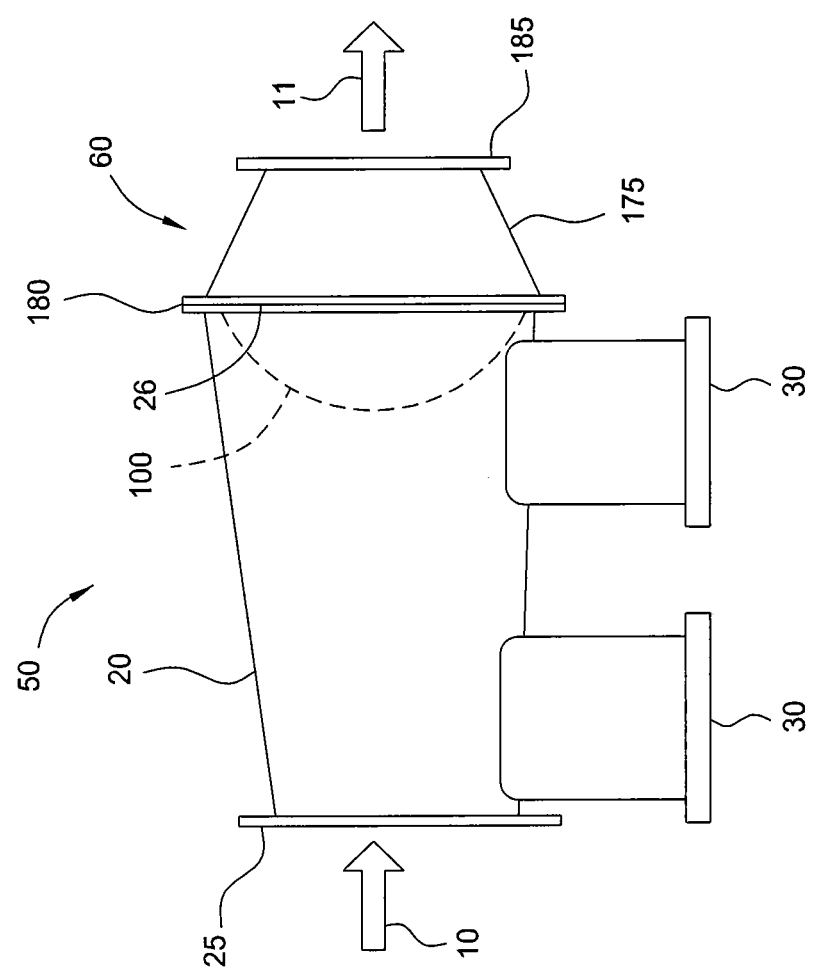
FIG. 1 illustrates a view of an exhaust manifold assembly and turbo inlet assembly with an embodiment of the invention.

To facilitate understanding, identical reference numerals have been used, where possible, to designate identical elements that are common to the figures. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a screen that is used in an exhaust manifold of large diesel engines, such as engines for ships, locomotives and the like. To better understand the aspects of the present invention and the methods of use thereof, reference is hereafter made to the accompanying drawings.

FIG. 1 is a view of one example of an exhaust manifold assembly 50 that is positioned above the engine cylinders and attached directly to the engine block. Generally, the exhaust manifold assembly 50 is used to direct exhaust into a turbo charger of a diesel engine (not shown). As illustrated, the exhaust manifold assembly 50 includes an exhaust manifold 20 coupled to a reducer assembly 60. The exhaust manifold 20 includes a manifold inlet 25 accepting exhaust flow from upstream manifold assemblies (not shown), a manifold outlet 26, and legs 30 which accepts exhaust flow directly from the engine cylinders.

Engine exhaust 10 entering the manifold inlet 25 from the engine flows through the exhaust manifold 20 and toward the reducer 175 during operation. Prior to exiting the reducer 175, the engine exhaust 10 passes through the screen 100 that is attached to the reducer 175. The perimeter of the screen 100 is securely attached to the reducer 175 in an orientation such that the upstream face of the screen 100 is concave. In one embodiment, the screen 100 is welded to the inlet 180 of the reducer 175. In another embodiment, the screen 100 may be attached to the inlet 180 of the reducer 175 by other suitable means, such as screws, adhesives, etc. In any case, the screen 100 is rigidly attached to the reducer 175 such that the reducer assembly 60 may be removed and replaced as a unit. The screened exhaust 11 exiting the reducer outlet 185 is utilized to run a turbo charger (not shown).

The screen 100 may be made from a plate 155 that is formed in a concave shape. The screen 100 is configured to substantially prevent debris from entering (and damaging) the turbo charger while at the same time allowing the engine exhaust 10 to flow into the inlet 180 of the reducer 175. When the exhaust manifold assembly 50 is in operation, the hot exhaust gas comprising the engine exhaust 10 passing through the screen may change the structural characteristics of the plate 155 of the screen 100. The screened exhaust 11 exits the exhaust manifold assembly 50 via the outlet 185 of the reducer 175. Since the majority of the exhaust flow is near the center of the reducer assembly 60 and thus the center of the screen 100, temperature gradients can exist radially on the screen 100 when the engine setting is changed from lower settings to higher settings or from higher settings to lower settings. These cycling conditions create thermal expansion and contraction of the screen 100.

Figure 2:
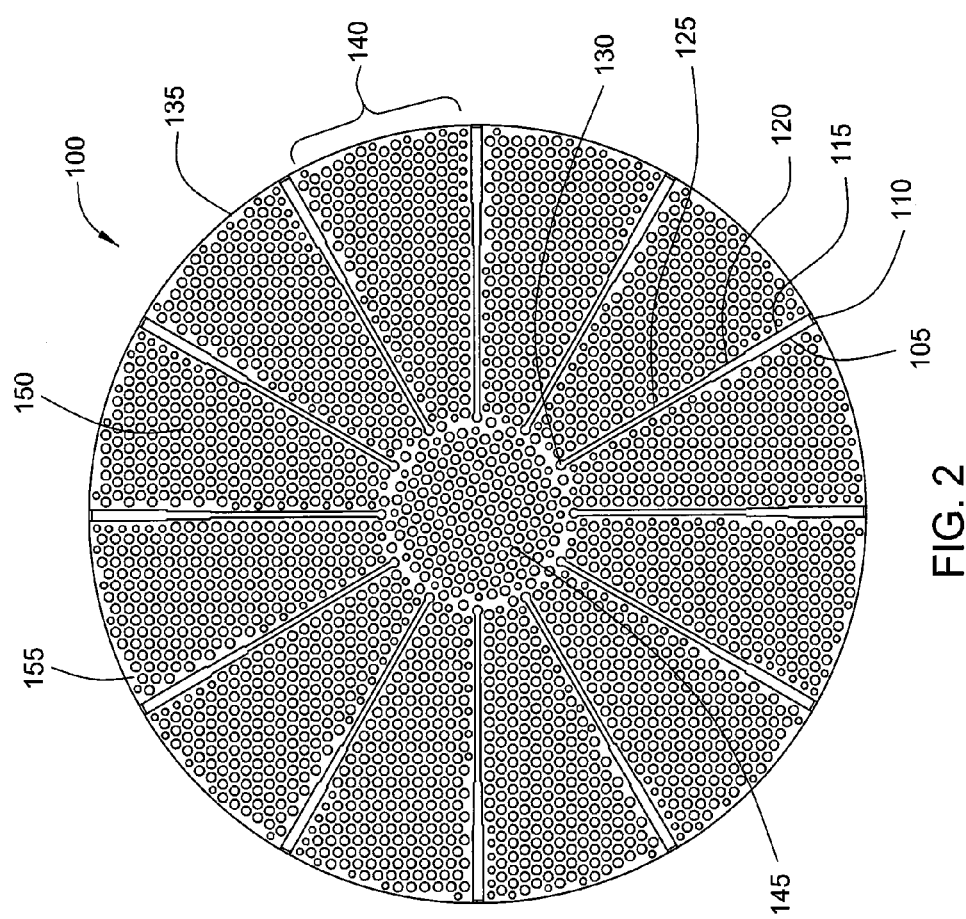
FIG. 2 illustrates a screen in accordance with one embodiment of the invention.

FIG. 2 is a front view of the screen 100. As illustrated, the screen 100 includes a plurality of apertures 150 formed through the plate 155 to allow gas to flow through the screen 100. The apertures 150 are formed in the plate 155 along substantially the entire surface area of the plate 155. This design provides substantially uniform open area, and specially, more open area in the center portion 145 of the screen 100 as compared to conventional flower patterned screens. This design also provides less pressure drop and better engine performance, as the engine exhaust 10 through the exhaust manifold assembly 50 is greater in the center, thus taking advantage of the greater open area of the center portion 145 of the screen 100. The apertures 150 in the plate 155 may have the same diameter or different diameters. In one embodiment, the apertures 150 have different diameters that range between 0.125 to 0.250 inches depending on the location on the screen 100. The use of apertures 150 with different diameters allows the apertures 150 to be positioned on the screen 100 such that a majority of the surface area of the plate 155 is utilized. In one embodiment, the apertures 150 in the plate 155 have at least 30 percent open area.

The screen 100 includes a plurality of radially oriented, closed slots 105 extending from a band 135 circumscribing a perimeter of the screen 100 radially inward toward the center portion 145 of the screen 100. In one embodiment the band 135 is cylindrical. In one embodiment the slots are non-intersecting. Although the screen 100 in FIG. 2 shows twelve equally-spaced slots 105, any number of slots 105 or any type of spacing may be used with the screen 100 without departing from the principles of the present invention. Generally, the slots 105 are utilized to allow for forming the conical shape without structural damage and also to accommodate thermal expansion of the plate 155 as the screen 100 is subjected to temperature cycling. Once the flat screen 100 has been formed to the conical shape, the slots 105 width have been reduced to respect the maximum distance allowable. The slots 105 are equally spaced around the circumference of the screen 100. The slots 105 allow the plate 155 of the screen 100 to flex, thereby reducing the stresses and potential cracking of the plate 155. Each slot includes a radially outward end 110, a first section 115, a second section 120, a third section 125 and a radially inward end 130. The radially outward end 110 may be spaced from the perimeter of the plate 155, while the radially inward end 130 is offset from the center of the plate 155. The sections 115, 120 and 125 may have the same length or different lengths. The width of each of the sections 115, 120 and 125 decreases along the slot 105 from the radially outward end 110 to the radially inward end 130. In other words, the first section 115 has the largest width and the third section 125 has the smallest width. In one embodiment, the width of the sections 115, 120 and 125 range between 0.125 to 0.25 inches depending on the location on the screen 100. In another embodiment, the width of the first section 115 may be equal to the diameter of the aperture 150 to allow the slots 105 to act as another flow passageway through the screen 100 while preventing debris from passing through the screen 100. As also shown in FIG. 2, the slots 105 divide the apertures 150 into sections 140. The slots 105 may also be tapered such that the inner third section 125 is narrower than the outer first section 115 to accommodate greater thermal expansion at the perimeter of the screen 100. The radially inward end 130 may also terminate in a hole or full radius to prevent stress concentrations which may lead to crack formations.

Figure 4:
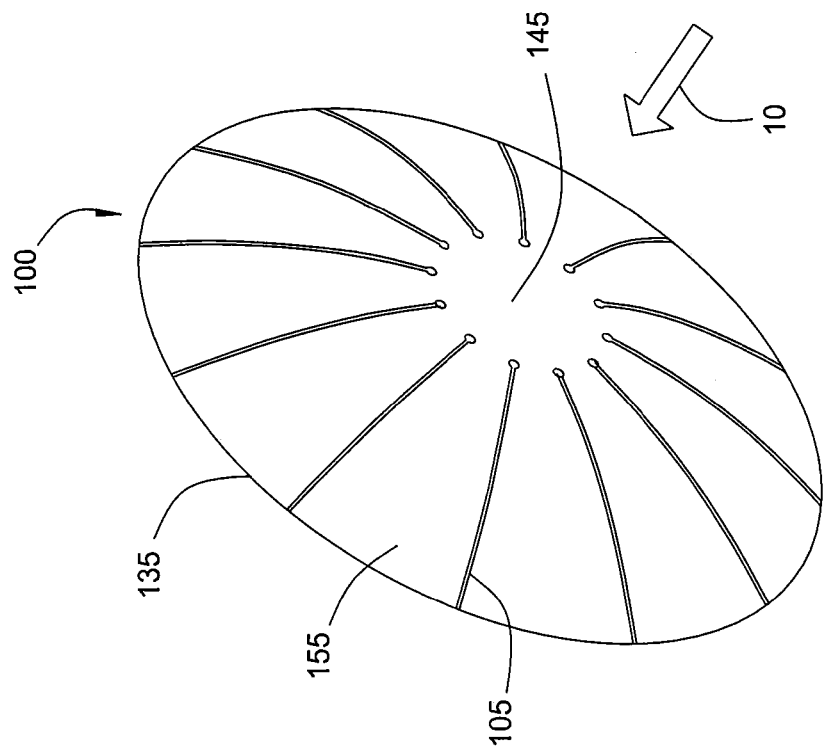
FIG. 4 illustrates a perspective view of the screen.
Figure 3:
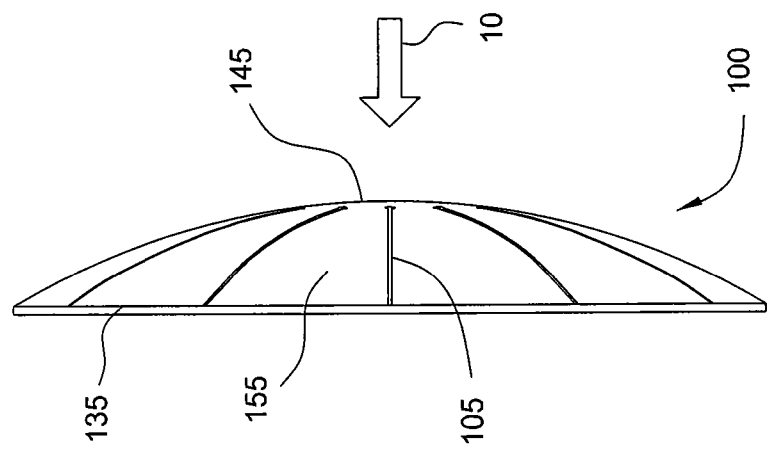
FIG. 3 illustrates a side view of the screen.

FIG. 3 illustrates a side view of the screen 100 and FIG. 4 illustrates a perspective view of the screen 100. For clarity, the apertures 150 are not shown in the plate 155 of the screen 100 illustrated in FIGS. 3 and 4. As shown in FIG. 3, the band 135 is disposed around the perimeter of the screen 100. The band 135 is used to hold the shape of the screen 100 which forms the concave shape of the screen 100 from a flat plate. As also shown, the slots 105 are closed so that the slots do not extend into the band 135, which allows the band 135 to hold the outer perimeter of the screen 100 in a defined circular shape during forming and facilitates fastening or welding to the reducer 175. In one embodiment, the plate 155 is made from a 410 stainless steel. However, the plate 155 may be made from other metallic materials without departing from the principles of the present invention. If the screen 100 is welded to the reducer 175, the material used for the plate 155 should have a similar coefficient of expansion as the material used to fabricate the reducer 175 (see FIG. 1).

As shown in FIGS. 3 and 4, the plate 155 is formed in a concave shape. The use of a concave shape allows thermal expansion to be accommodated by axial deflection of the plate 155, thereby reducing the stresses and potential cracking of the plate 155. In addition, the concave shape of the plate 155 allows for greater impact resistance, which is an important aspect as the screen 100 filters out the debris moving with the engine exhaust 10. The benefits of the concave shape of the plate 155 in combination with the benefits of the slots 105 described herein allows the plate 155 to be made from a much thinner material as compared to the material used in the conventional screen, thus resulting in a less costly and more environmentally friendly product. For example, one embodiment of the screen 100 may be fabricated from 0.078 to 0.250 inch thick 410 stainless steel has demonstrated substantially equal impact resistance as conventional flat plate designs currently in use on diesel locomotives.

In one embodiment, the screen 100 is made by the following fabricating process. The plate 155 is formed from a sheet stock or blank. The apertures 150 are then formed in the plate 155 by a drill or other perforating machinery. The slots are formed (or cut) in the plate 155 by a milling operation or a slot punch. It is contemplated that the order of fabrication of the slots 105 and apertures 150 may be selected by convenience or done simultaneously. After the apertures 150 and the slots 105 are in the plate 155, the (flat) plate 155 is formed into the concave shape as shown in FIGS. 3 and 4. The shaping of the plate 155 can be done by a variety of different methods, such as a punching operation. The plate 155 is then stress relieved and the screen 100 attached to the reducer 175, for example, by welding, to form the reducer assembly 60.

Figure 5:
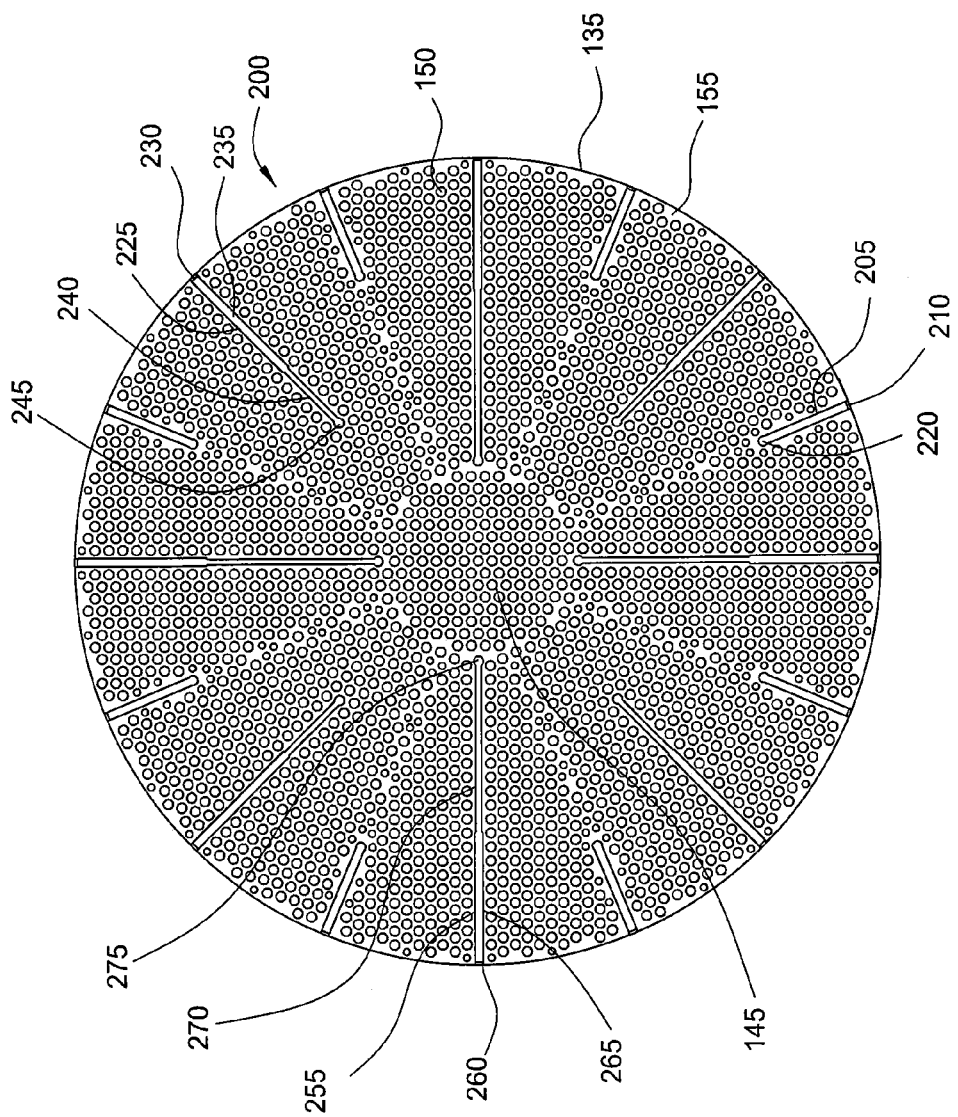
FIG. 5 illustrates a screen in accordance with one embodiment of the invention.

FIG. 5 illustrates a screen 200 in accordance with one embodiment of the invention. For convenience, the components in the screen 200 that are similar to the components in the screen 100 will be labeled with the same number indicator. The screen 200 is made from the plate 155 which is formed in a concave shape. The screen 200 includes a plurality of apertures 150 formed in the plate 155 along substantially the entire surface area of the plate 155. The placement of the apertures 150 allow for a substantially uniform open area, particularly in the center portion 145 of the screen 200.

The screen 200 includes a plurality of short slots 205, a plurality of medium slots 225 and a plurality of long slots 255. The slots 205, 225 and 255 are utilized to accommodate thermal expansion of the plate 155 as the screen 200 is subjected to temperature cycling. The slots 205, 225 and 255 extend from a position proximate the band 135 toward the center portion 145. The short slots 205 have a uniform width and include a radially outward end 210 and a radially inward end 220. The medium slots 225 have a width that tapers from a first section 235 to a second section 240, and the medium slots 225 include a radially outward end 230 and a radially inward end 245. The long slots 255 have a width that tapers from a first section 265 to a second section 270, and the long slots 255 include a radially outward end 260 and a radially inward end 275. The width of the largest section of each slot 205, 225 and 255 may be equal to the diameter of the aperture 150 to allow each slot 205, 225 and 255 to act as another flow passageway in the screen 200 while preventing debris from passing through the screen 200. As illustrated in FIG. 5, the slots 205, 225 and 255 are arranged in a pattern to allow certain sections of the plate 155 to flex more due to thermal expansion than other sections of the plate 155, while facilitating greater thermal expansion.

Figure 6:
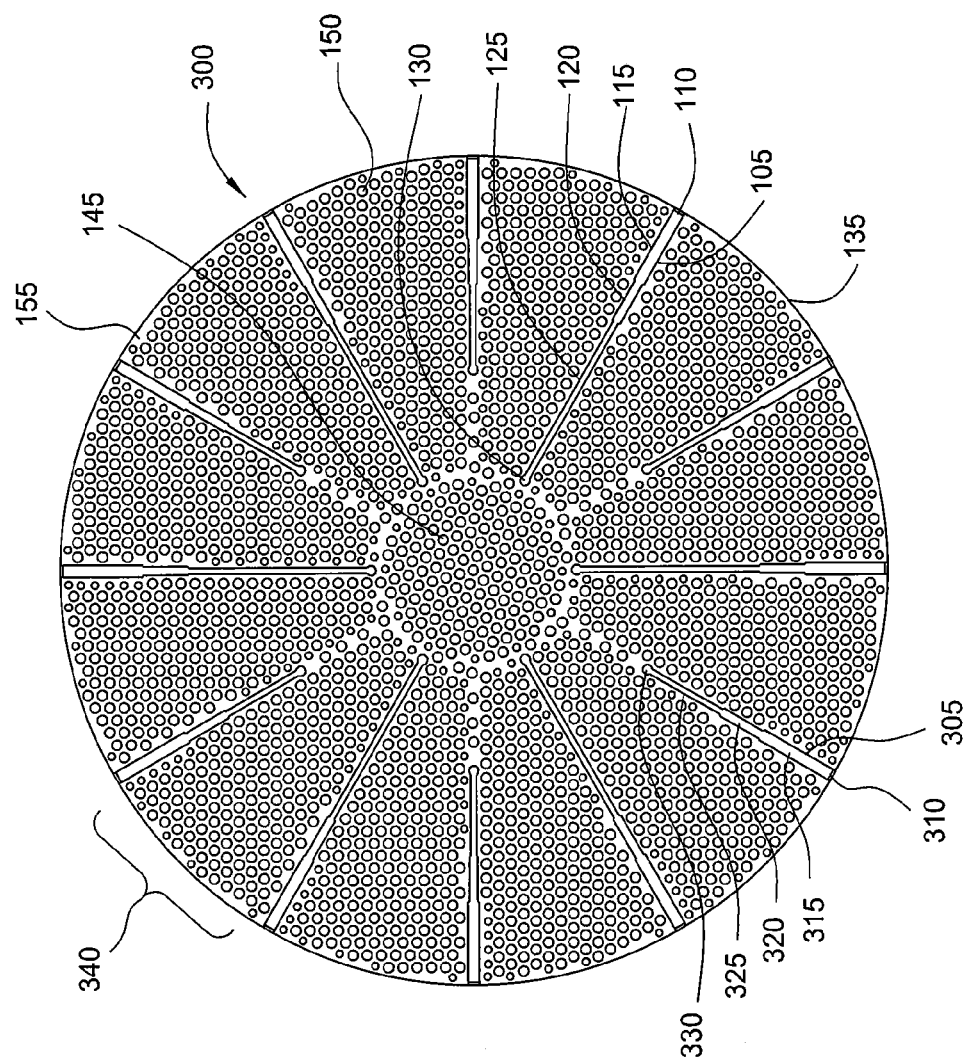
FIG. 6 illustrates a screen in accordance with one embodiment of the invention.

FIG. 6 illustrates a screen 300 in accordance with one embodiment of the invention. For convenience, the components in the screen 300 that are similar to the components in the screen 100 will be labeled with the same number indicator. The screen 200 includes a plurality of apertures 150 formed in the plate 155 to allow for a substantially uniform open area, particularly in the center portion 145 of the screen 300. The screen 300 includes the slots 105 and a plurality of radially orientated closed short slots 305 which are used to accommodate thermal expansion of the plate 155. The short slots 305 have a width that tapers from a first section 320 to a second section 325, and the short slots 305 include a radially outward end 310 and a radially inward end 330. As illustrated in FIG. 6, the slots 105 and 305 are arranged in a pattern and the slots 105, 305 define sections 340. The arrangement of the 105 and 305 in a pattern allows certain sections of the plate 155 to flex more due to thermal expansion than other sections of the plate 155. Similar to the other screens 100, 200 described herein, the screen 300 is a concave shape which accommodates for thermal expansion by axial deflection of the plate 155, and the concave shape allows for greater impact resistance, thus reducing the stresses and potential cracking of the plate 155.

While the foregoing is directed to embodiments of the present invention, other and further embodiments of the invention may be devised without departing from the basic scope thereof, and the scope thereof is determined by the claims that follow.

The invention claimed is:

1. A screen for use in an exhaust manifold assembly, the screen comprising:
 a plate formed in a concave shape, the plate having a concave surface, the concave surface having a plurality of apertures and a plurality of non-intersecting, radially oriented slots formed therein, wherein the plurality of slots and apertures have a size and open area selected to prevent debris from entering a turbo charger, the slots separate the apertures into predefined sections, a radially outward end of the slots is spaced from a perimeter of the plate, and wherein the plurality of radially oriented slots further comprises a plurality of short slots, a plurality of medium slots, and a plurality of long slots.

2. The screen of claim 1, wherein the plate further comprises:
 a cylindrical band defined at an outer perimeter of the plate, wherein the slots do not extend through the band.

3. The screen of claim 1, wherein the plurality of apertures have different diameters that range between 0.125 inches to 0.25 inches.

4. The screen of claim 1, wherein the plurality of apertures form at least 30% open area of the plate.

5. The screen of claim 1, wherein at least a first slot of the plurality of radially oriented slots further comprises a first section, a second section, a third section and a radially inward end, the sections having different widths.

6. The screen of claim 5, wherein the third section is narrower than the first section.

7. The screen of claim 5, wherein the radially inward end terminates in a hole or full radius.

8. The screen of claim 1, wherein the screen is fabricated from 0.078 inch to 0.250 inch thick 410 stainless steel.

9. The screen of claim 1, wherein the plurality of short slots have a uniform width.

10. The screen of claim 1, wherein the plurality of medium slots further comprises:
 a first section; and
 a second section, wherein the plurality of medium slots have a width that tapers from the first section to the second section towards a center of the plate.

11. The screen of claim 1, wherein the plurality of long slots further comprises:
 a first section; and
 a second section, wherein the plurality of long slots have a width that tapers from the first section to the second section towards a center of the plate.

12. The screen of claim 1, wherein the plurality of slots further comprises a plurality of radially oriented closed short slots.

13. The screen of claim 12, wherein the plurality of closed short slots further comprises:
 a first section; and
 a second section, wherein the plurality of closed short slots have a width that tapers from the first section to the second section towards a center of the plate.

14. A reducer assembly for use in an exhaust manifold assembly, the reducer assembly comprising:
 a reducer having an inlet and an outlet; and
 a screen attached to the inlet of the reducer, the screen including a concave plate having a concave surface, the concave surface having a plurality of apertures and a plurality of non-intersecting, radially oriented slots formed therein, wherein the plurality of slots and apertures have a size and open area selected to prevent debris from entering a turbo charger, the apertures form at least 30% open area of the plate, and the plurality of radially oriented slots further comprises a plurality of short slots, a plurality of medium slots, and a plurality of long slots.

15. The reducer assembly of claim 14, wherein the screen is welded to the inlet.

16. The reducer assembly of claim 14, wherein the plate further comprises:
   a cylindrical band defined at an outer perimeter of the plate, wherein the slots do not extend through the band.

17. The reducer assembly of claim 14, wherein the plurality of apertures have different diameters that range between 0.125 inches to 0.25 inches.

* * * * *